United States Patent [19]
Yamamura et al.

[11] Patent Number: 5,664,244
[45] Date of Patent: Sep. 2, 1997

[54] VIEWFINDER DEVICE

[75] Inventors: Takeyuki Yamamura, Fujisawa;
Takashi Mizuguchi, Kodaira;
Nobushige Kobayashi, Hachioji;
Kazumi Koike, Minami-ashigara, all of Japan

[73] Assignees: Fuji Photo Film Co., Ltd., Kanagawa;
TOA Rikagaku Co., Ltd., Tokyo, both of Japan

[21] Appl. No.: 524,365

[22] Filed: Sep. 6, 1995

Related U.S. Application Data

[63] Continuation-in-part of Ser. No. 363,348, Dec. 23, 1994, abandoned.

[30] Foreign Application Priority Data

| Sep. 6, 1994 | [JP] | Japan | 6-212674 |
| Jan. 13, 1995 | [JP] | Japan | 7-004369 |
| Mar. 10, 1995 | [JP] | Japan | 7-051280 |

[51] Int. Cl.$^6$ ............................................. G03B 13/02
[52] U.S. Cl. ................................. 396/296; 396/382
[58] Field of Search .......................... 354/281, 296, 354/373, 382; 396/287, 296, 373, 382

[56] References Cited

U.S. PATENT DOCUMENTS 5,309,201  5/1994  Lyon.

FOREIGN PATENT DOCUMENTS 52-141637  5/1976  Japan.

*Primary Examiner*—David M. Gray
*Attorney, Agent, or Firm*—Fish & Richardson, P.C.

[57] ABSTRACT

A viewfinder device has an objective lens element (2) disposed on a viewfinder light path and an eyepiece lens element (3, 28) disposed behind the objective lens element. An image (10) of an object (7) is observable at an eye point (EP). At least one indicia portion (4, 12, 13, 20, 25, 35, 36, 40a, 40b) is disposed in front of the eyepiece lens element, for indicating information related to a taking field. At least one micro lens (5, 5a, 5b, 6a, 6b, 9a, 9b, 14, 17, 22, 30, 32a, 32b) has positive power, is disposed behind the indicia portion, renders an image of the indicia portion observable, and meets $$0.5 \leq 2e \cdot \tan \theta \leq 2.5$$

where $e$ is a distance from the micro lens to the eye point, and $\theta$ is a half of an angle defined by a convex surface of the micro lens as viewed from the eye point.

24 Claims, 8 Drawing Sheets

F I G. 10
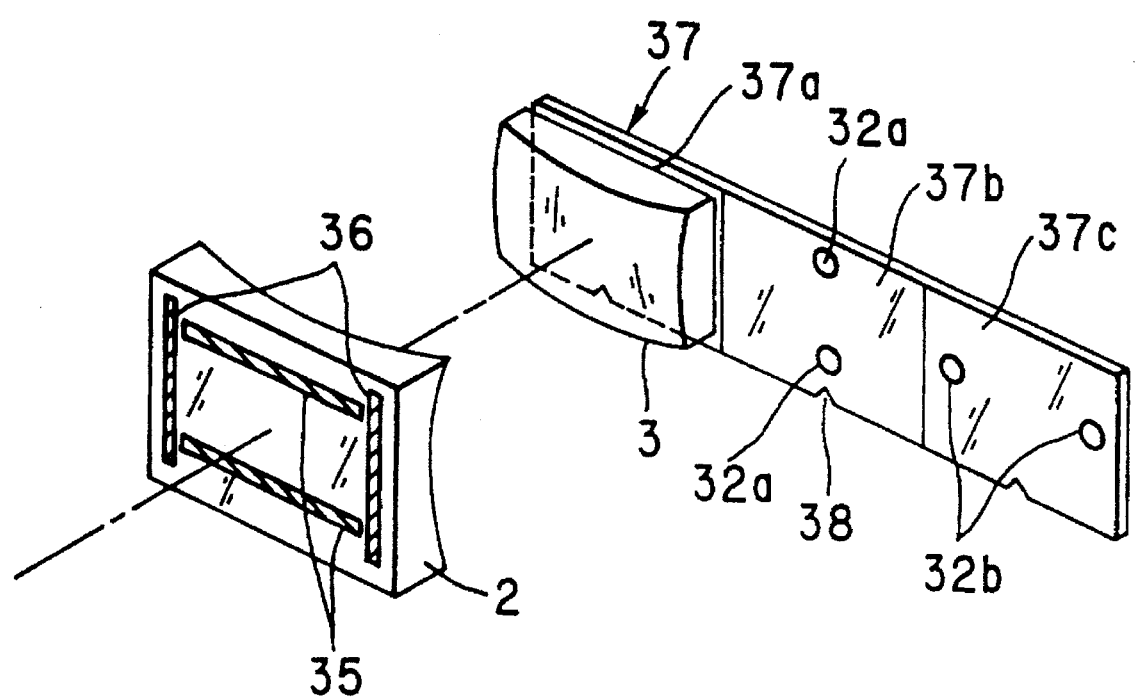

VIEWFINDER DEVICE

This application is a continuation-in-part application of U.S. application Ser. No. 08/363,348, filed Dec. 23, 1994, now abandoned.

BACKGROUND OF THE INVENTION

1. Field of the Invention

The present invention relates to a viewfinder device for a camera. More particularly, the present invention relates to a viewfinder device in which a target indicia or frame indicia for a photographic field to be framed can be observed clearly with an object image.

2. Description Related to the Prior Art

A viewfinder device is incorporated in a compact camera or a lens-fitted photo film unit in which photo film is pre-contained in a state as goods for sale. There is a widely used type called a reversed Galilean viewfinder device. Examples of improved versions of reversed Galilean viewfinder device are an illuminating window type, an Albada type and the like, which are characterized in viewfield indicia rendered observable for indication of a photographable range in the field of view. However the illuminating window type and the Albada type have a shortcoming of high cost with their complicated structure.

There is a prior document JP-A (Japanese Patent Laid-open Publication No.) 52-141637, in which an objective lens element or a transparent plate behind the objective lens element is provided with frame indicia for indicating a viewfield. Micro lenses ("convex lens optical elements") for adjustment of diopter are formed integrally with either an eyepiece lens element or the transparent plate, and renders the frame indicia observable as viewfield frame image. There is an advantage in the prior document in low cost, because the simplest one of its examples has the indicia on the objective lens element of plastics, and the micro lenses formed with the eyepiece lens element of plastics.

In the viewfinder device disclosed in JP-A 52-141637, the micro lenses form erect virtual images of the indicia in a position near to the position of a virtual image of an object. There is no problem when only the object image is observed through the objective lens element and the eyepiece lens element, or when only the indicia image is observed through the micro lenses. However, while the indicia is observed, part of the object image is also seen through the micro lenses as well as through the objective and eyepiece lens elements. Part of light flux from the object is passed through the micro lenses and refracted thereby the more to the extent of the power (refracting power) of the micro lenses. There occurs a difference in diopter between the object image of light flux passed through the objective and eyepiece lens elements, and the object image of light flux passed through micro lenses.

In general, the photographers aiming through a viewfinder device make their eye target an object to be photographed. It follows that each photographer observes the object image with advertence, but observes images of the frame indicia only incidentally, as his eye is focussed sharply on the object images, but less sharply on the frame indicia images. If he focuses his eye sharply on the frame indicia images through the micro lenses, the object image comes out-of-focus to his eye. It is difficult to check whether the object image is acceptably framed with reference to the frame indicia.

Such a problem is more serious with a target indicia than that of the frame indicia: The target indicia is formed in the center of the objective lens element, while a micro lens is formed in the center of the eyepiece lens element for rendering the target indicia observable. The micro lens refracts the light flux from the center of the object to the excessive extent, and changes the position of the object image in unwanted fashion from a desired position. There occurs a difference in position between the target indicia image and the object image. It is impossible in JP-A 52-141637 to position any micro lens on the optical axis. No center can be indicated in the viewfinder device with such a micro lens.

SUMMARY OF THE INVENTION

In view of the foregoing problems, an object of the present invention is to provide a viewfinder device in which frame indicia for a photographic field to be framed can be observed clearly with an object image.

Another object of the present invention is to provide a viewfinder device in which a target indicia at the center of a photographic field can be observed clearly with an object image.

In order to achieve the above and other objects and advantages of this invention, at least one indicia portion is disposed in front of the eyepiece lens element, for indicating information related to a taking field. At least one micro lens having positive power is disposed behind the indicia portion, for rendering an image of the indicia portion observable in enlargement, and meets $$0.5 \leq 2e \cdot \tan \theta \leq 2.5$$

where $e$ is a distance from the micro lens to the eye point, and $\theta$ is a half of an angle defined by a convex surface of the micro lens as viewed from the eye point.

In a preferred embodiment, a transparent plate is disposed behind the indicia portion. At least one micro lens having a small diameter is disposed on the transparent plate, for rendering an image of the indicia portion observable. The indicia portion image associated with the object image observable with light passed outside the micro lens.

The at least one indicia portion includes a target indicia portion for substantially indicating a center of the taking field, and/or plural frame indicia portions for representing a periphery of the taking field. The at least one micro lens includes a middle micro lens associated with the target indicia portion, and/or plural peripheral micro lenses respectively associated with the frame indicia portions.

In another preferred embodiment, first and second sets of frame indicia portions are disposed in front of a periphery of the eyepiece lens element, for respectively representing first and second peripheries of a taking field. First and second micro lenses are respectively disposed behind the first and second set frame indicia portions, for rendering an image of the first and second set frame indicia portions observable in enlargement. A transparent plate is disposed behind the first and second frame indicia portions, the first and second micro lenses disposed on the transparent plate, the transparent plate slidable between first and second positions. The transparent plate is slid to the first position, for setting the first micro lens behind the first set frame indicia portion, to allow observation of the first set frame indicia portion. The transparent plate is slid to the second position, for setting the second micro lens behind the second set frame indicia portion, to allow observation of the second set frame indicia portion.

In still another preferred embodiment, first and second sets of frame indicia portions are disposed in front of a periphery of the eyepiece lens element, for respectively representing first and second peripheries of a taking field. First and second micro lenses are respectively disposed behind the first and second set frame indicia portions, for rendering an image of the first and second set frame indicia portions observable in enlargement. A transparent changeover plate is disposed behind the first and second set frame indicia portions, and having first and second opaque light-shielding portions, the changeover plate slidable between first and second positions. The changeover plate is slid to the first position to set the first light-shielding portion between the first set frame indicia portion and the first micro lens, to allow observation of the second set frame indicia portion. The changeover plate is slid to the second position to set the second light-shielding portion between the second set frame indicia portion and the second micro lens, to allow observation of the first set frame indicia portion.

BRIEF DESCRIPTION OF THE DRAWINGS

The above objects and advantages of the present invention will become more apparent from the following detailed description when read in connection with the accompanying drawings, in which:

FIGS. 9 and 10 are perspective views illustrating still other preferred viewfinder device having peripheral indicia;

DETAILED DESCRIPTION OF THE PREFERRED EMBODIMENT(S) OF THE PRESENT INVENTION

Figure 1:
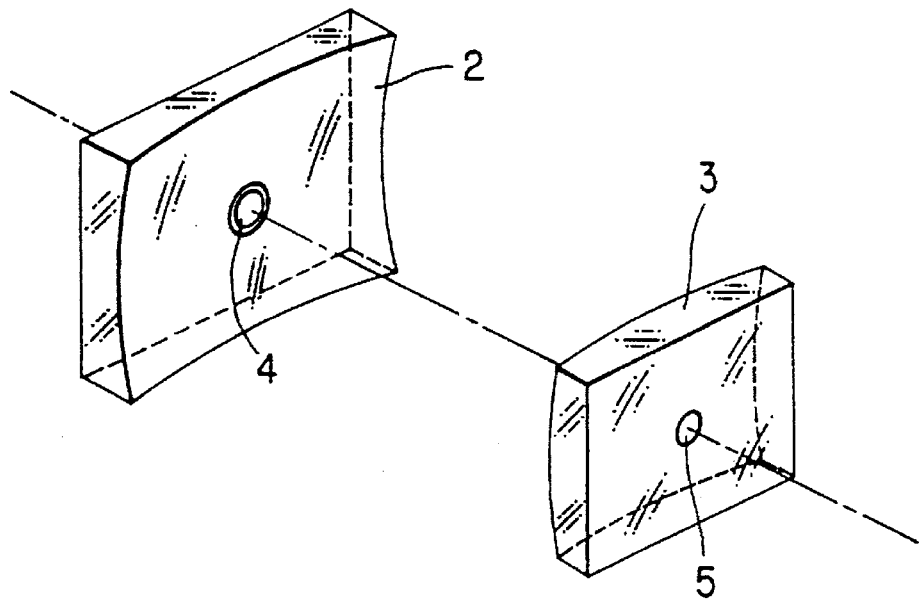
FIG. 1 is a perspective view illustrating a reversed Galilean viewfinder device where the present invention is embodied.
Figure 2:
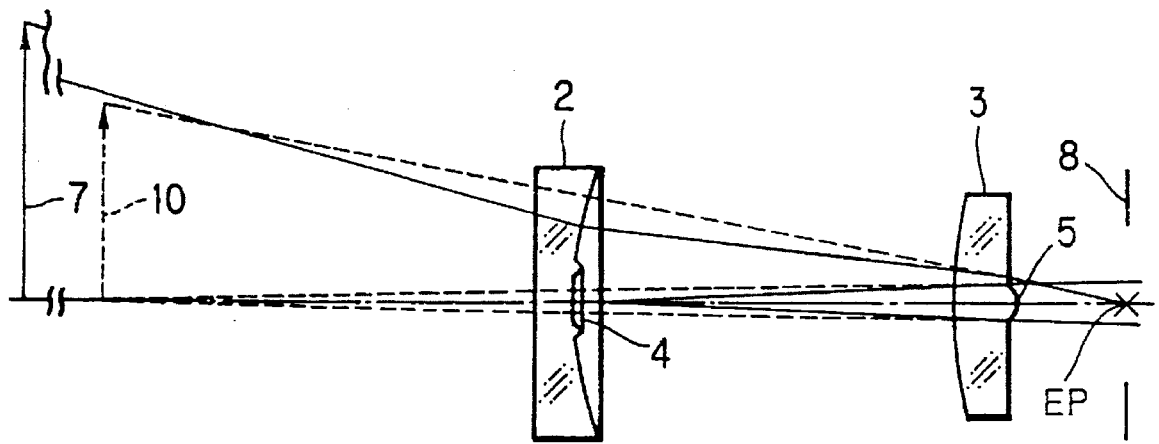
FIG. 2 is an explanatory view illustrating a light path of the viewfinder device of FIG. 1.
Figure 3:
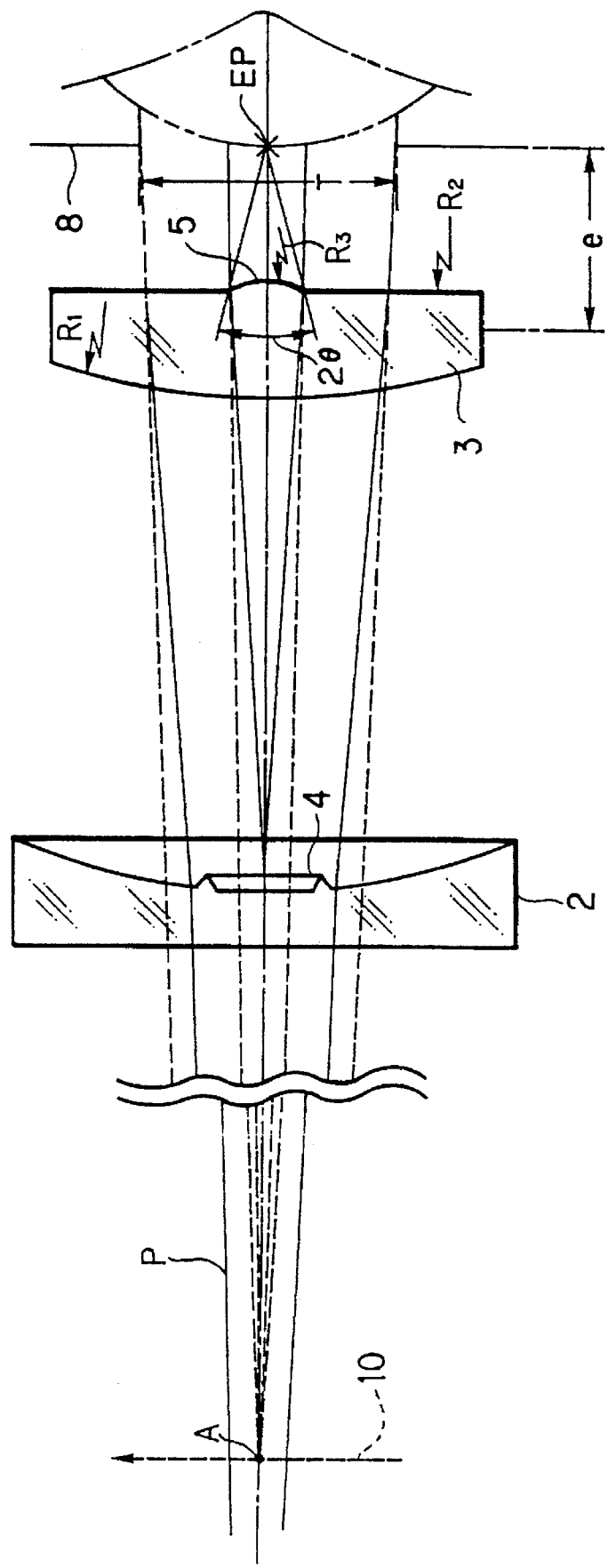
FIG. 3 is an explanatory view illustrating a state where a light flux from the center of the object comes into a micro lens.

FIG. 1 illustrates a viewfinder device of a reversed Galilean type. An objective lens element 2 has a negative power. An eyepiece lens element 3 has a positive power. The objective lens element 2 and the eyepiece lens element 3 are respectively formed from plastics. A rear face of the objective lens element 2 has a target indicia 4 of a ring shape. The target indicia 4 is adapted to indicating a center of a viewfield frame in visible fashion to one who observes a field of view through the viewfinder device. As illustrated in FIGS. 2 and 3, the target indicia 4 consists of a ring-like projection of which a section is triangular. The target indicia 4 is formed at the same time as forming the objective lens element 2.

The target indicia 4, alternatively, can be formed as a ring-like recess in the lens face, or else deposited as thin membrane, printed with black ink or translucent color ink. Otherwise a portion in a mold for the objective lens element 2 for the ring shape of the target indicia 4 can be provided with a rough surface. The ring-like portion after being molded can be roughened in accordance with sandblasting. The drawing illustrates the simplest projected shape of the target indicia 4. This is advantageous in simplifying the mold for the objective lens element 2 to reduce a manufacturing cost.

A rear face of the eyepiece lens element 3 has a micro lens 5 formed integrally therewith. The eyepiece lens element 3 also operates as a transparent plate for supporting the micro lens 5. FIG. 2 illustrates a light path of the viewfinder device as an optical system. The light from an object 7 to be photographed is passed through the objective lens element 2 and then the eyepiece lens element 3, and comes to an eye point EP defined at an exit pupil 8 of the eyepiece lens element 3 and adapted to positioning of a photographer's eye, which observes an object image 10 as a virtual image of normally erected orientation in the position indicated by the broken lines. In general, the position of the object image 10 is determined to be observable to a photographer from 0 diopter to −1 diopter. In accordance with this, the powers of the objective lens element 2 and the eyepiece lens element 3 are determined. Note that it is also possible to arrange a transparent parallel plate behind the eyepiece lens element 3, and to form the micro lens 5 with the transparent plate.

With the target indicia 4 located in front of the micro lens 5, the virtual image of the target indicia 4 is formed by refracting function of the micro lens 5 with the positive power, and can be observed by the photographer's eye in the position nearly the same as the object image 10. The object image 10 is observed at the same diopter as the images of the target indicia 4. In the embodiment, the target indicia 4 is formed integrally with the objective lens element 2 while the micro lens 5 is formed integrally with the eyepiece lens element 3. No particular member is added to the basically structured reversed Galilean viewfinder device. It follows that there is little rise in cost of the viewfinder device as compared with conventional viewfinder devices. No particular posterior treatment is required for the objective lens element 2 and the eyepiece lens element 3 as formed. It is sufficient to provide the grooves or recesses for the target indicia 4 and the micro lens 5 in the molds for the objective lens element 2 and the eyepiece lens element 3. This is highly suitable to mass production.

Let the objective lens element 2 have a focal length of F1. Let the eyepiece lens element 3 have a focal length of F2. Let the objective lens element 2 and the eyepiece lens element 3 have respective powers p1 and p2, which are reciprocals of F1 and F2. A lens interval $\underline{d}$ at which the object image 10 is observable at D diopter is determined according to approximation of a thin lens at a paraxial region, as follows:

$$d = [1000 \times (p1+p2) - D]/(1000 \times p1 \times p2 - D \times p1)$$

A viewfinder magnification β is determined as:

$$\beta = 1/[(1-p1 \times d)-(p1+p2-p2 \times d) \times e]$$

where $e$ is a distance between the eye point EP and a principal point of the eyepiece lens element 3.

Let F3 be a focal length in combination of the eyepiece lens element 3 and the micro lens 5. Let p3 be a combined power of the eyepiece lens element 3 and the micro lens 5. Let the target indicia 4 be $d$ away from the eyepiece lens element 3. To render the target indicia 4 observable in the position the same as the object image 10, a condition of the following equation should be met:

$$1/F3 = p3 = (1000 + D \times d)/(1000 \times d)$$

The lens interval and the focal length of the lens combination are so limited in view of practical use that $d \leq 30$ (mm) and $F3 \leq 4$ (mm). Then the following Condition (1) is obtained:

$$0.20 \leq F3/|F2|\cdot\beta \leq 0.25 \qquad (1)$$

Examples of the various values were tentatively derived as below:

TABLE 1

| F1 (mm) | F2 (mm) | $d$ (mm) | β | F3 (mm) | F3/|F2| · β |
|---|---|---|---|---|---|
| −23.00 | 36.50 | 12.21 | 0.64 | 12.37 | 0.22 |
| −19.00 | 32.50 | 12.48 | 0.60 | 12.63 | 0.23 |
| −30.00 | 61.00 | 27.49 | 0.51 | 28.27 | 0.24 |
| 203.50 | −151.00 | 25.64 | 1.13 | 26.32 | 0.20 | where D is −1 diopter.

The values F1, F2, F3 and $d$ are determined in the range of Condition (1), so that the object image 10 and the images of the target indicia 4 are observable at the equal diopter.

When the target indicia 4 is observed, the light flux P from the object is partially passed through the micro lens 5 before coming to the photographer's eye. Naturally the light flux P, as illustrated in FIG. 3, is passed through the objective lens element 2 to be dispersed, and then passed through the eyepiece lens element 3 in positions outside the micro lens 5 (where the focal length F2 of the eyepiece lens element 3 is determined by a diameter R1 of a front face and a diameter R2 of curvature of a rear face), to come incident on the eye at the pupil diameter T. A component of the light flux P from the object passed within the micro lens 5 is refracted the more to the extent corresponding to a diameter R3 of curvature of a face of the micro lens 5, and would form a virtual image in a position different from the object image 10.

In the present invention, the light flux through the micro lens 5 is sufficiently small as compared with the light flux through the outside of the micro lens 5 as part of the light flux P from the object to the exit pupil 8 at the pupil diameter T of the human eye. The human eye is focussed at the object image 10 located at the point A lying on the optical axis, and can see the object image 10 in as clear fashion as the images of the target indicia 4. For such desired operation, the micro lens 5 should have a small diameter in consideration of the pupil diameter T. It is reasonable that the diameter of the micro lens 5 should be determined on the basis of an angle formed by the circumference of the micro lens 5 as viewed from the eye point EP, where the photographer's eye is placed for observation.

Let θ be a half of an angle which is defined at the eye point EP and between two distal ends of the convex face of the micro lens 5 which lies on a plane including an optical axis, namely between upper and lower ends of the micro lens 5. The micro lens 5 is formed to have θ meeting $$0.5 \leq 2e\cdot\tan\theta \leq 2.5 \qquad (2)$$

in view of the characteristic of the human eye in which the pupil diameter T becomes 2.5 mm when the human pupil is extremely stopped down. Should 2e·tan θ be over 2.5, it would be difficult to observe an object. Should 2e·tan θ be below 0.5, it would be difficult to observe the target indicia 4, and also to manufacture the target indicia 4 as it must be extremely precise.

Figure 4:
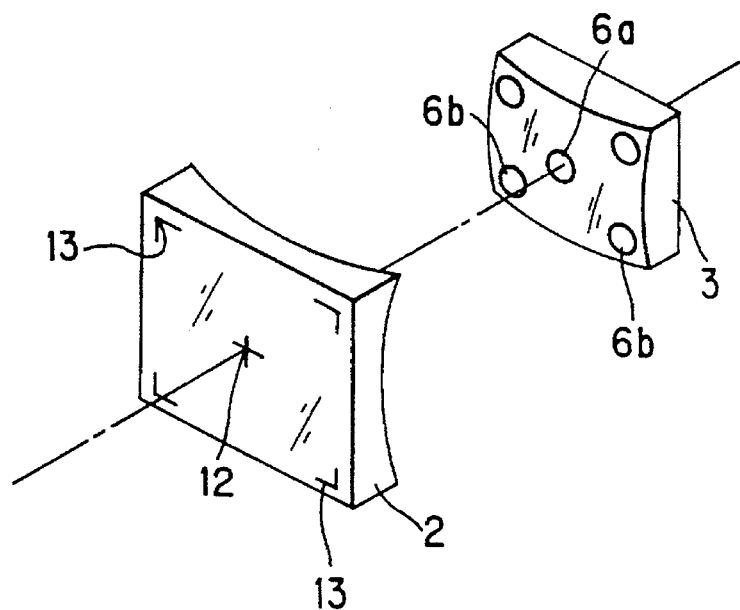
FIGS. 4 and 5 are perspective view illustrating other preferred viewfinder devices having frame indicia.

FIG. 4 illustrates another preferred embodiment, in which the front face of the objective lens element 2 is provided with frame indicia 13 in addition to a target indicia 12 of a crossed shape. The frame indicia 13 are located on respective four corners of the objective lens element 2, and indicate a photographable range in the viewfield frame. The frame indicia 13 are seen through peripheral plural micro lenses 6b, and observable together with the target indicia 12 when the object image 10 is observed. Note that the micro lenses 6b for the frame indicia 13 also meet Conditions (1) and (2) as well as a middle micro lens 6a for the target indicia 12. It is alternatively possible to dispose the target indicia 12 and the frame indicia 13 on the rear face of the objective lens element 2, and to dispose the micro lenses 6a and 6b on the rear face of the eyepiece lens element 3. If all the micro lenses 6a and 6b have a common diameter, the peripheral micro lenses 6b respectively have a smaller angle viewed from the eye point EP than an angle of the middle micro lens 6a. However the smallness of the angle is not a problem, if only Condition (2) is met.

Figure 5:
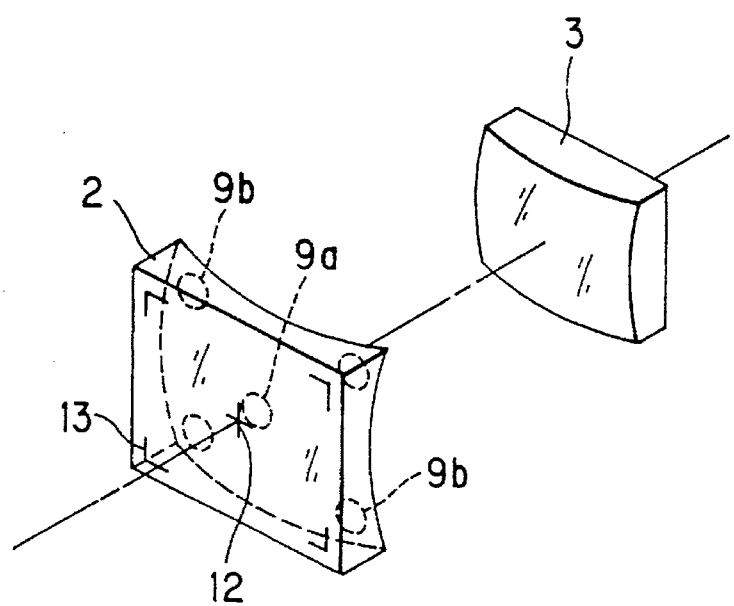

FIG. 5 illustrates a further preferred embodiment, in which the target indicia 12 and the frame indicia 13 are formed in the front face of the objective lens element 2. The rear face of the objective lens element 2 is provided with micro lenses 9a and 9b. The power of the micro lenses 9a and 9b can be suitably determined, so that it is possible to observe images of the target indicia 12 and 13 at diopters the same as the object image. Since the objective lens element 2 includes the target indicia 12 and the frame indicia 13 and the micro lenses 9a and 9b, there is an advantage in that the target indicia 12 and the frame indicia 13 can be clearly observable even there is low precision in combination of the objective lens element 2 and the eyepiece lens element 3. It is also favorable that the diameter of the micro lenses 9a and 9b can be set greater, and the micro lenses 9a and 9b can be manufactured more easily.

Figure 6:
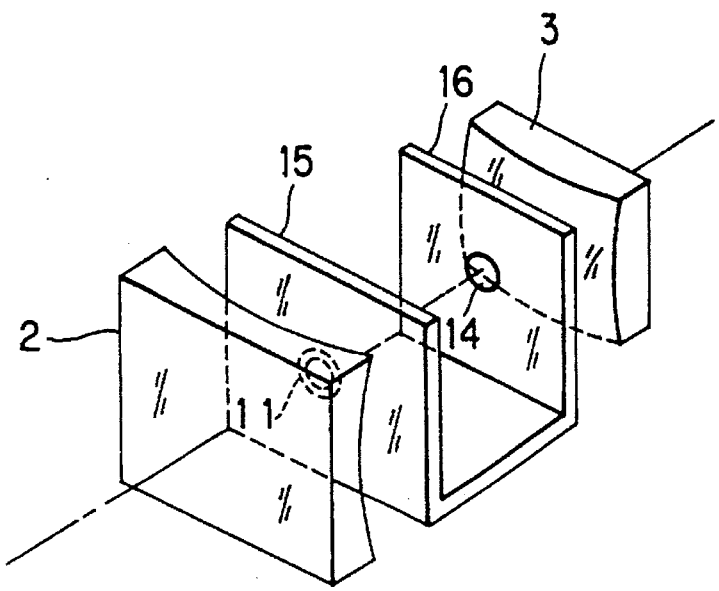
FIG. 6 is a perspective view illustrating another preferred viewfinder device where a target indicia is separate from an objective lens element.

FIG. 6 illustrates still another preferred embodiment, in which two parallel transparent plates 15 and 16 as a single plastic piece are inserted. The plate 15 located in the front has a target indicia 11. The plate 16 located in the rear has a micro lens 14. In combination, the target indicia 11 with the micro lens 14 operates in similar fashion to the former embodiments. Note that the target indicia 11 may be located either of the front and rear faces of the plate 15. The micro lens 14 may be located either of the front and rear faces of the plate 16. It is also possible to use front and rear faces of the objective lens element 2 and the eyepiece lens element 3 for disposing either of the target indicia 11 and the micro lens 14. Any combination of the faces is possible if the target indicia 11 is located in front of the micro lens 14.

Figure 7:
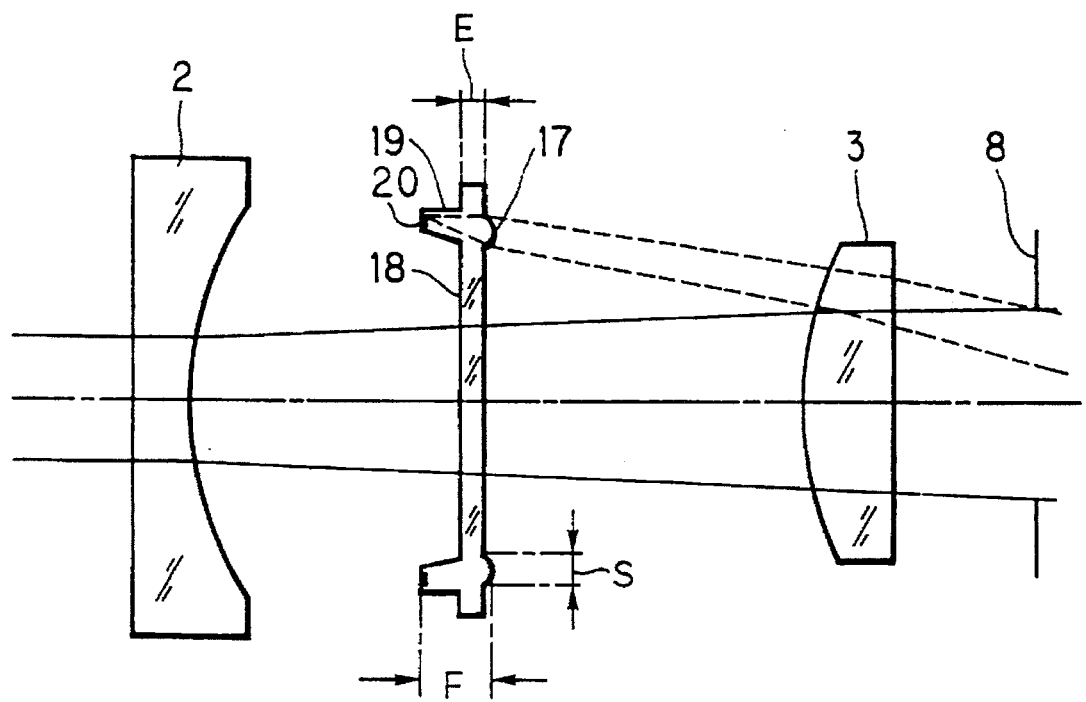
FIG. 7 is an explanatory view in elevation, illustrating a further preferred viewfinder device where frame indicia portions are formed integrally with micro lenses.

FIG. 7 illustrates another preferred embodiment, in which frame indicia 20 for a frame are indicated inside a fully open viewfield frame. A transparent base plate 18 is disposed between the objective lens element 2 and the eye-piece lens element 3 in parallel with the lenses. A front face of the base plate 18 has two ridges 19 extended in a direction perpendicular to a surface of the drawing sheet of FIG. 7. The frame indicia 20 are disposed on the ridges 19. Micro lenses 17 are formed on the rear face of the base plate 18, and positioned behind the center of the frame indicia 20 with reference to the lengthwise direction of the frame indicia 20.

The base plate 18 has the thickness E of 1 mm. The micro lenses 17 have a respective diameter S of 0.6 mm, and a radius of curvature of 1 mm. An interval F between the frame indicia 20 and a rear vertex of the micro lenses 17 is 2.75 mm. As indicated by the broken lines in FIG. 7, the light flux from the frame indicia 20 are diverging while directed to the exit pupil 8, so that the diameter S of the micro lenses 17 can be somewhat small. Note that, if the interval F is set somewhat great, the power of the micro lenses 17 can be set small.

It is possible instead of the micro lenses 17 to form "micro" cylindrical lenses on the base plate 18 to extend in the direction perpendicular to the surface of the drawing sheet. Each cylindrical lens has a power only relative to its width direction. The width of the cylindrical lenses corresponds to the diameter S of the micro lens of the present invention. The above-described transparent base plate 18 is stationary within the light path to indicate the field frame. Alternatively it is possible to adapt the frame indicia 20 for a partially masked frame for a panoramic size, by shortening the interval between the frame indicia 20. The base plate 18 can be structured in movable fashion into and away from the light path, in linkage with selection of panoramic photography or full-size photography.

Figure 8:
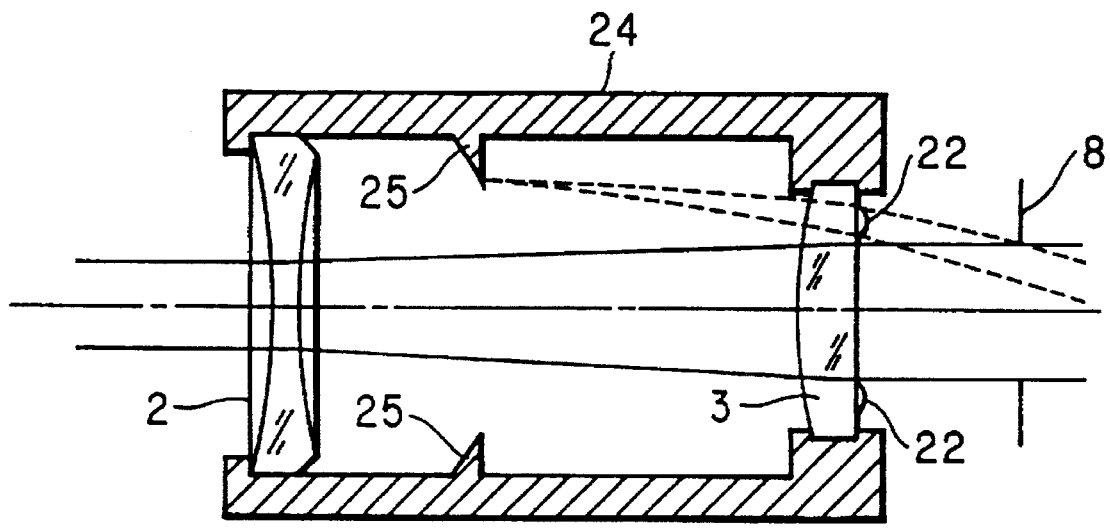
FIG. 8 is an explanatory view in section, illustrating another preferred viewfinder device where a viewfinder barrel is utilized.

FIG. 8 illustrates still another preferred embodiment, in which the inside of a viewfinder barrel 24 has projections 25 as frame indicia portions. A rear face of the eyepiece lens element 3 has two micro lenses 22 similar to the counterparts above. Edges of the projections 25 are rendered observable as frame indicia portions by the micro lenses 22. It is alternatively possible to arrange the projections 25 in front of the objective lens element 2. It is also possible to dispose a transparent base plate in front of the objective lens element 2, and to form the projections 25 on the transparent base plate.

Figure 9:
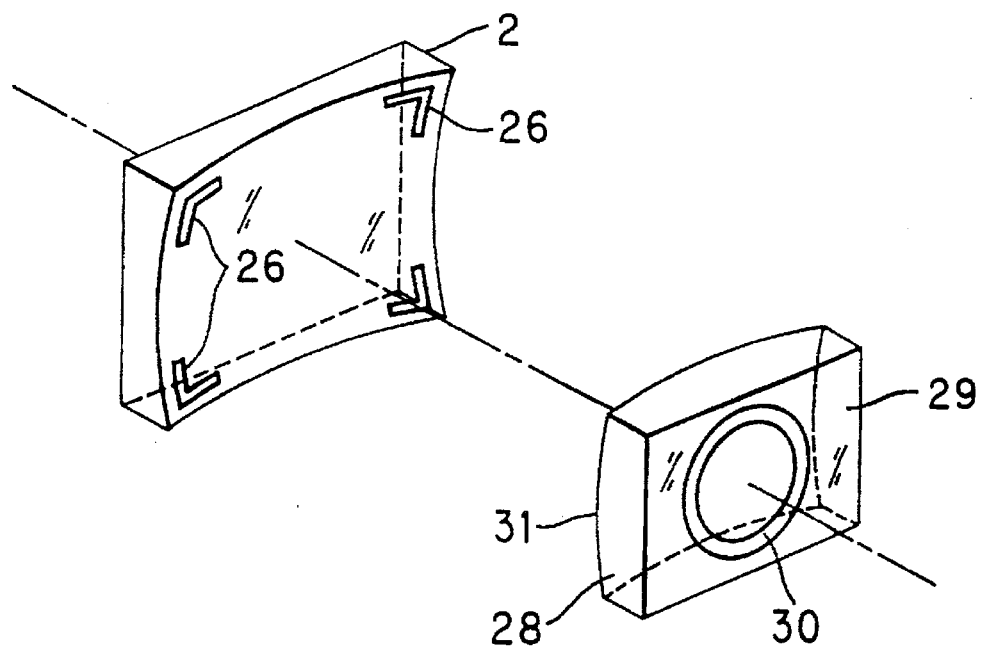

FIG. 9 illustrates another reversed Galilean viewfinder device including the objective lens element 2 being concave and an eyepiece lens element 28 being convex. A rear face of the objective lens element 2 has four corners at which frame indicia 26 are formed. Correspondingly a single ring-like micro lens 30 is formed on a rear flat face 29 of the eye-piece lens element 28.

The eye-piece lens element 28 is provided with positive power by a front convex face 31. The object image is rendered observable by the objective lens element 2 and the eye-piece lens element 28 in the predetermined position. The images of the frame indicia 26 are formed in the vicinity of the object image by the micro lens 30 of the ring shape. Although small part of the light flux from the object is passed through the micro lens 30, most of the light flux from the object is passed through the rear plane face 29 without refraction of the micro lens 30. It is possible to observe the object image at the diopters the same as for the frame indicia 26. Note that there are two partial curves included in the micro lens 30 and defined by cross section on which the optical axis lies. Two distal ends of each of the two partial curves are viewed from the eye point EP to define the angle 2θ, which is required to meet Condition (2).

FIG. 10 illustrates another preferred embodiment, in which panoramic frame indicia 35 and C-size frame indicia 36 are disposed on a front face of the objective lens element 2. Behind the eye-piece lens element 3 is disposed a transparent base plate 37 in horizontally slidable fashion. The base plate 37 includes a standard area 37a, a panoramic area 37b and a C-size area 37c. There is disposed a known clicking spring (not shown) which is engaged with click notches 38 for the purpose of positioning any of the standard area 37a, the panoramic area 37b and the C-size area 37c behind the eye-piece lens element 3.

When the wide-vision (WV) photograph (to be printed at the size of 89×158 mm) is intended, the standard size is designated, by operating an externally operable mode selector (not shown). The standard area 37a is positioned behind the eye-piece lens element 3 as illustrated. Since the standard area 37a is flat, the frame indicia 35 or 36 can never be observed, as the diopter for their observation is different from the diopter for observation of the object image seen through the eye-piece lens element 3.

When the panoramic photograph (to be printed at the size of 89×254 mm) is intended, the panoramic size is designated to slide the base plate 37 to the left in the drawing. The panoramic area 37b is positioned behind the eye-piece lens element 3. Information of designating the panoramic size is optically recorded to the photo film by the camera. Since the panoramic area 37b has micro lenses 32a arranged at the top and the bottom, images of the panoramic frame indicia 35 can be observed at diopters the same as the object image. The C-size frame indicia 36 can never be observed, as the diopter of their observation is different from the diopter of observing the object image.

When the L-size photograph (to be printed at the size of 89×127 mm) is intended, the C-size is designated to slide the base plate 37 further to the left in the drawing. The C-size area 37c is positioned behind the eye-piece lens element 3. Information of designating the C-size is optically recorded to the photo film by the camera. Since the C-size area 37c has micro lenses 32b arranged at the right and the left, images of the C-size frame indicia 36 can be observed at diopters the same as the object image. The panoramic frame indicia 35 can never be observed, as the diopter of their observation is different from the diopter of observing the object image.

In a manner similar to the above embodiments, the size of the micro lenses 32a and 32b is determined to meet Conditions (1) and (2). The object image is never out-of-focus to the photographer's eye when the eye-piece lens elements 35 and 36 are looked at. No problems of excessively enlarging the viewfinder device or raising difficulties in forming the micro lenses 32a and 32b with excessively great power. It is to be noted that the frame indicia may be modified for compensation of parallax, and may be selectively indicated in the viewfinder device.

Figure 11:
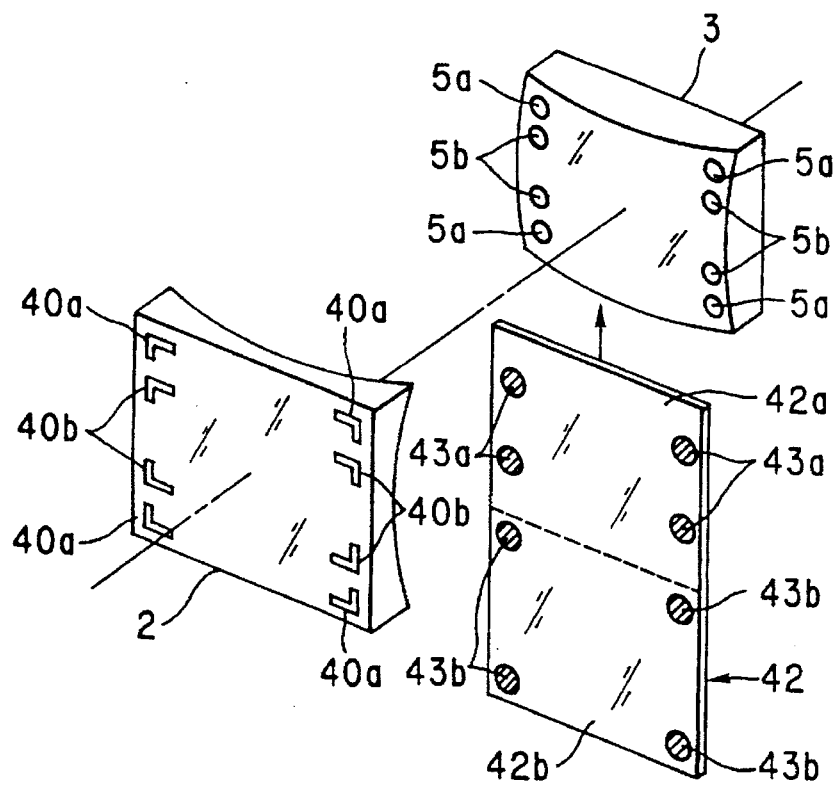
FIG. 11 is an exploded perspective view illustrating another preferred viewfinder device where frame indicia is selectable.

For selective designation from sets of indicia for plural viewfields of different ranges, it is possible to use a structure of FIG. 11. Standard frame indicia 40a and panoramic frame indicia 40b are disposed in the front face of the objective lens element 2. On the rear face of the eye-piece lens element 3, there are disposed micro lenses 5a corresponding to the standard frame indicia 40a, and micro lenses 5b corresponding to the panoramic frame indicia 40b.

Figure 12:
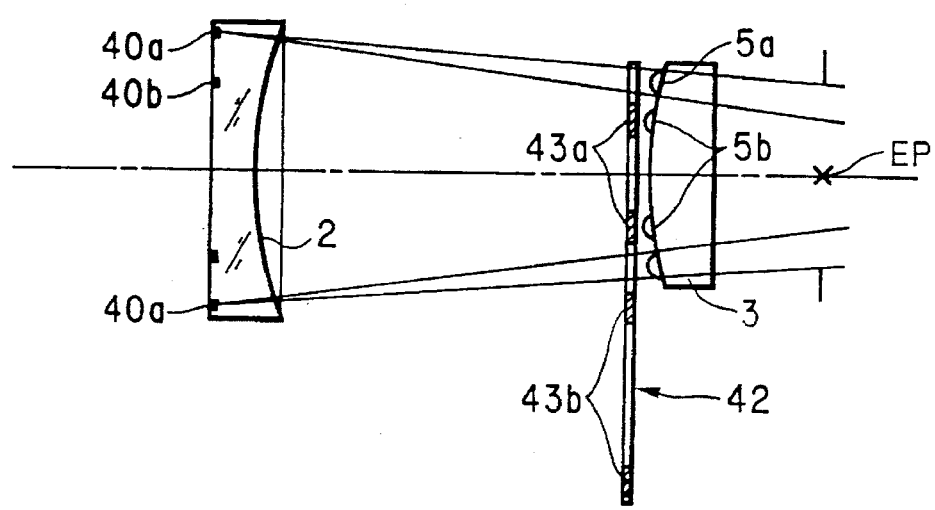
FIG. 12 is an explanatory view in elevation, illustrating the viewfinder device of FIG. 11.

Near the front face of the eye-piece lens element 3, there is a transparent changeover plate 42 slidable in the vertical direction. The changeover plate 42 has a standard area 42a and a panoramic area 42b, which are selectively positioned in the light path. The standard area 42a has circular opaque light-shielding portions 43a. When the standard area 42a is inserted in the light path, the light-shielding portions 43a are located respectively in front of the micro lenses 5b as illustrated in FIG. 12. The panoramic area 42b has also opaque portions 43b. When the panoramic area 42b is inserted in the light path, the light-shielding portions 43b are located respectively in front of the micro lenses 5a.

When an externally operable mode selector is operated to select the standard photography, the rear of the micro lenses 5b is intercepted by the light-shielding portions 43a in the light path as illustrated in FIG. 12. With the human eye placed at the eye point EP, the object image is observed through the objective lens element 2 and the eye-piece lens element 3. Images of the standard frame indicia 40a are also observed through the micro lenses 5a, while the panoramic frame indicia 40b are invisible to the human eye. When the panoramic photography is selected, the changeover plate 42 is slid up, so that the rear of the micro lenses 5a is intercepted by the light-shielding portions 43b in the light path. Images of the panoramic frame indicia 40b are observed through the micro lenses 5a, while the standard frame indicia 40a are in turn invisible to the human eye.

The micro lenses 5a and 5b also meet Conditions (1) and (2) of $F3/F2 \cdot \beta$ and $2e \cdot \tan \theta$. No matter which set of the frame indicia 40a and 40b is indicated, the object image is formed visibly as virtual image in the position defined by the objective lens element 2 and the eye-piece lens element 3. Each virtual image of the frame indicia 40a and 40b is formed in the vicinity of the object image. The object image and the frame indicia 40a or 40b are simultaneously observable at the same diopter clearly. Note that the changeover plate 42 is close to the eye-piece lens element 3, so that the whole of the object image can be seen and never be cut off by the light-shielding portions 43a and 43b circularly. It is possible to modify the changeover plate 42 in a horizontally slidable structure, or else to dispose a changeover plate behind the eye-piece lens element 3.

The viewfinder devices of the above embodiments are a reversed Galilean type. The present invention is of course applicable to other types of viewfinder device, such as a direct viewfinder device or a Galilean type inclusive of an objective lens of a positive power and an eye-piece lens of a negative power.

Figure 13:
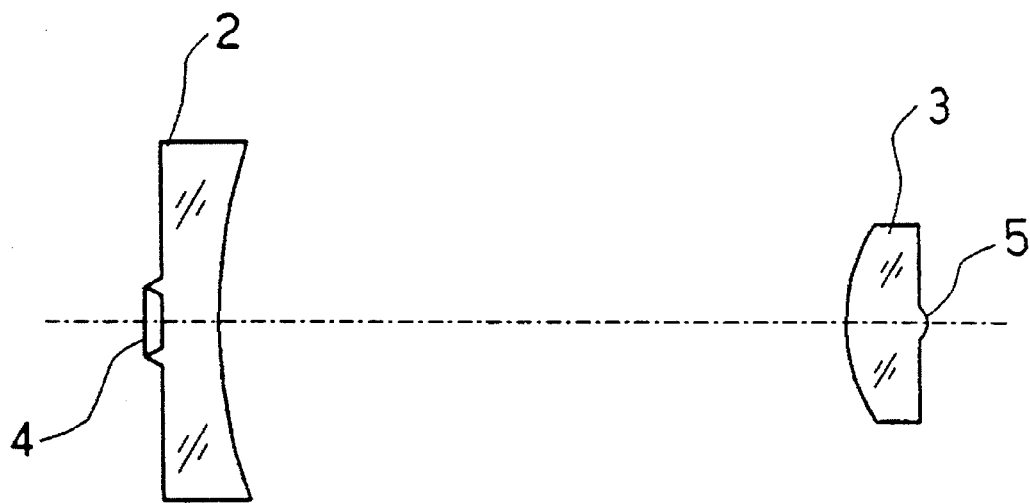
FIGS. 13 and 14 are explanatory views in elevation, illustrating variant viewfinder devices.
Figure 14:
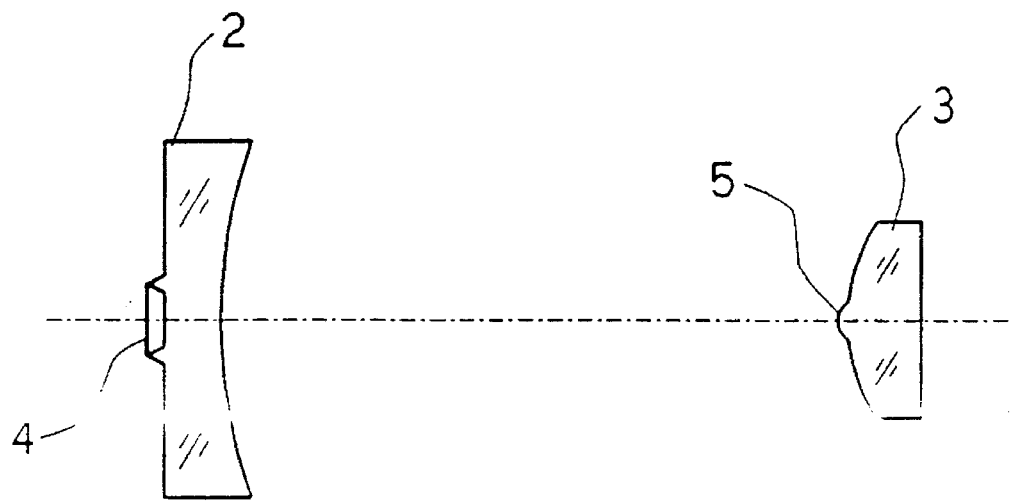

Note that, for the effects of the embodiment of FIG. 1, it is also possible to form the target indicia 4 on the front face of the objective lens element 2, as illustrated in FIGS. 13 and 14. The micro lens 5 can be formed behind the eye-piece lens element 3 in FIG. 13, or in front of the eye-piece lens element 3 in FIG. 14. Either of those variants can be selected in consideration of focal lengths of the lens elements 2 and 3, the lens interval, and the size of the target indicia 4.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A viewfinder device, having an objective lens element disposed on a viewfinder light path and an eye-piece lens element disposed behind said objective lens element, for rendering an image of an object observable at an eye point, said viewfinder device comprising:

at least one indicia portion, disposed in front of said eye-piece lens element, for indicating information related to a taking field; and at least one micro lens having positive power, disposed behind said indicia portion, for rendering an image of said indicia portion observable in enlargement, said micro lens meeting $$0.5 \leq 2e \cdot \tan \theta \leq 2.5$$

where $e$ is a distance from said micro lens to said eye point, and $\theta$ is a half of an angle defined by a convex surface of said micro lens as viewed from said eye point.

2. A viewfinder device as defined in claim 1, comprising a reversed Galilean viewfinder device, wherein said objective lens element has negative power p1, and said eye-piece lens element has positive power p2.

3. A viewfinder device as defined in claim 1, wherein said objective lens element, said eye-piece lens element and said micro lens meet:

$$0.20 \leq F3/F3/F2 \cdot \beta \leq 0.25$$

where $\beta$ is magnification of said viewfinder device, F2 is a focal length of said eye-piece lens element, F3 is a combined combined length of said eye-piece lens element and said micro lens.

4. A viewfinder device as defined in claim 1, wherein said indicia portion is disposed on one face of said objective lens element, and said micro lens is disposed on one face of said eye-piece lens element.

5. A viewfinder device as defined in claim 4, wherein said indicia portion is a target indicia portion for substantially indicating a center of said taking field.

6. A viewfinder device as defined in claim 5, wherein said target indicia portion is a ring-like projection formed integrally with said objective lens element and projected in triangular fashion, and said micro lens is formed integrally with said eye-piece lens element.

7. A viewfinder device as defined in claim 5, wherein said target indicia portion has a crossed shape.

8. A viewfinder device as defined in claim 4, wherein said indicia portion is at least one frame indicia portion for representing a border of said taking field.

9. A viewfinder device as defined in claim 1, wherein said at least one indicia portion includes a target indicia portion for substantially indicating a center of said taking field, and plural frame indicia portions, for representing a periphery of said taking field, and said at least one micro lens includes a middle micro lens associated with said target indicia portion, and plural peripheral micro lenses respectively associated with said frame indicia portions.

10. A viewfinder device as defined in claim 9, wherein said target indicia portion is disposed on a middle of one face of said objective lens element, said frame indicia portions are disposed on a periphery of said objective lens element, said middle micro lens is disposed on a middle of one face of said eye-piece lens element, and said peripheral micro lenses are disposed on a periphery of one face of said eyepiece lens element.

11. A viewfinder device as defined in claim 9, wherein said target indicia portion is disposed on a middle of a front face of said objective lens element, said frame indicia portions are disposed on a periphery of said front face of said objective lens element, said middle micro lens is disposed on a middle of a rear face of said eyepiece lens element, and said peripheral micro lenses are disposed on a periphery of said rear face of said eyepiece lens element.

12. A viewfinder device as defined in claim 1, further comprising:

a first transparent plate, disposed between said objective lens element and said eyepiece lens element, said indicia portion formed integrally with said first plate for substantially indicating a center of said taking field; and a second transparent plate, disposed between said first plate and said eyepiece lens element and substantially in parallel with said first plate, said micro lens disposed on said second plate.

13. A viewfinder device as defined in claim 1, further comprising a transparent plate, disposed between said objective lens element and said eyepiece lens element, and having a front face on which said indicia portion is disposed, and a rear face on which said micro lens is disposed.

14. A viewfinder device as defined in claim 1, wherein said at least one indicia portion includes a first set of plural frame indicia portions for representing a first periphery of said taking field, said first set frame indicia portions disposed in front of a periphery of said eyepiece lens element.

15. A viewfinder device as defined in claim 14, wherein said micro lens is formed integrally with said a periphery of said eyepiece lens element, and ring-like in association with positions of said frame indicia portions.

16. A viewfinder device as defined in claim 14, further comprising a viewfinder barrel for containing said objective lens element and said eyepiece lens element in light-tight fashion, to define said light path;

said frame indicia portions are disposed between said objective lens element and said eyepiece lens element, and projected from said viewfinder barrel toward said light path; and said micro lens is formed integrally with a periphery of said eyepiece lens element in association with positions of said frame indicia portions.

17. A viewfinder device as defined in claim 14, further comprising a transparent plate disposed behind said eyepiece lens element, and having first said micro lens disposed thereon, said transparent plate slidable between a first position and an initial position, said first micro lens in said first position being set behind said first set frame indicia portions, to allow observation of said first set frame indicia portions, said first micro lens in said initial position being retracted from behind said objective lens element, to render unobservable said first set frame indicia portions.

18. A viewfinder device as defined in claim 17, wherein said at least one indicia portion further includes a second set of plural frame indicia portions for representing a second periphery of said taking field, said second set frame indicia portions disposed in front of a periphery of said eyepiece lens element;

said second micro lens is disposed on said transparent plate, said transparent plate is further slidable to a second position, and said second micro lens in said second position is set behind said second set frame indicia portions, to allow observation of said second set frame indicia portions.

19. A viewfinder device as defined in claim 18, wherein said first set frame indicia portions have orientation horizontal with reference to said viewfinder light path, and said first periphery covers a range of which an aspect ratio is greater than an aspect ratio of said taking field fully opened; and said second set frame indicia portions have orientation vertical with reference to said viewfinder light path, and said second periphery covers a range of which an aspect ratio is smaller than said aspect ratio of said taking field fully opened.

20. A viewfinder device as defined in claim 14, wherein said at least one indicia portion further includes a second set of plural frame indicia portions for representing a second periphery of said taking field, said second set frame indicia portions disposed in front of said periphery of said eyepiece lens element;

said first and second micro lenses are formed integrally with a periphery of said eyepiece lens element respectively behind said first set frame indicia portions and behind said second set frame indicia portions;

further comprising a transparent changeover plate, disposed between said objective lens element and said eyepiece lens element, and having first and second opaque light-shielding portions, said changeover plate slidable between first and second positions, said changeover plate slid to said first position to set said first light-shielding portion between said first set frame indicia portion and said first micro lens, to allow observation of said second set frame indicia portion, said changeover plate slid to said second position to set said second light-shielding portion between said second set frame indicia portion and said second micro lens, to allow observation of said first set frame indicia portion.

21. A viewfinder device, having an objective lens element disposed on a viewfinder light path and an eyepiece lens element disposed behind said objective lens element, for rendering an image of an object observable, said viewfinder device comprising:

first and second sets of frame indicia portions, disposed in front of a periphery of said eyepiece lens element, for respectively representing first and second peripheries of a taking field;

first and second micro lenses, respectively disposed behind said first and second set frame indicia portions, for rendering an image of said first and second set frame indicia portions observable in enlargement; and a transparent plate, disposed behind said first and second frame indicia portions, said first and second micro lenses disposed on said transparent plate, said transparent plate slidable between first and second positions; said transparent plate slid to said first position, for setting said first micro lens behind said first set frame indicia portion, to allow observation of said first set frame indicia portion; said transparent plate slid to said second position, for setting said second micro lens behind said second set frame indicia portion, to allow observation of said second set frame indicia portion.

22. A viewfinder device as defined in claim 21, wherein each of said first and second micro lenses meets $$0.5 \leq 2e \cdot \tan \theta \leq 2.5$$

where $e$ is a distance from said transparent plate to an eye point defined by said objective lens element and said eyepiece lens element, and $\theta$ is a half of an angle defined by a convex surface of each said micro lens set in said light path as viewed from said eye point.

23. A viewfinder device, having an objective lens element disposed on a viewfinder light path and an eyepiece lens element disposed behind said objective lens element, for rendering an image of an object observable, said viewfinder device comprising:

first and second sets of frame indicia portions, disposed in front of a periphery of said eyepiece lens element, for respectively representing first and second peripheries of a taking field;

first and second micro lenses, respectively disposed behind said first and second set frame indicia portions, for rendering an image of said first and second set frame indicia portions observable in enlargement; and a transparent changeover plate, disposed behind said first and second set frame indicia portions, and having first and second opaque light-shielding portions, said changeover plate slidable between first and second positions, said changeover plate slid to said first position to set said first light-shielding portion between said first set frame indicia portion and said first micro lens, to allow observation of said second set frame indicia portion, said changeover plate slid to said second position to set said second light-shielding portion between said second set frame indicia portion and said second micro lens, to allow observation of said first set frame indicia portion.

24. A viewfinder device as defined in claim 23, wherein each of said first and second micro lenses meets $$0.5 \leq 2e \cdot \tan \theta \leq 2.5$$

where $e$ is a distance from each said micro lens to an eye point defined by said objective lens element and said eyepiece lens element, and $\theta$ is a half of an angle defined by a convex surface of each said micro lens in said light path as viewed from said eye point.

* * * * *